United States Patent
Zhou et al.

(10) Patent No.: US 10,771,699 B2
(45) Date of Patent: Sep. 8, 2020

(54) SYSTEMS AND METHODS FOR ROLLING SHUTTER CORRECTION

(71) Applicant: SZ DJI TECHNOLOGY CO., LTD., Shenzhen (CN)

(72) Inventors: You Zhou, Shenzhen (CN); Cong Zhao, Shenzhen (CN); Jie Qian, Shenzhen (CN); Peiliang Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 13 days.

(21) Appl. No.: 16/184,557

(22) Filed: Nov. 8, 2018

(65) Prior Publication Data
US 2019/0098217 A1  Mar. 28, 2019

Related U.S. Application Data

(63) Continuation of application No. PCT/CN2016/082898, filed on May 20, 2016.

(51) Int. Cl.
*H04N 5/232* (2006.01)
*H04N 5/353* (2011.01)

(52) U.S. Cl.
CPC ....... *H04N 5/23267* (2013.01); *H04N 5/2329* (2013.01); *H04N 5/23258* (2013.01); *H04N 5/3532* (2013.01)

(58) Field of Classification Search
CPC ............ H04N 5/23267; H04N 5/2329; H04N 5/3532; H04N 5/23258
See application file for complete search history.

(56) References Cited

U.S. PATENT DOCUMENTS

| | | | |
|---|---|---|---|
| 9,826,202 B2 * | 11/2017 | Eline | H04N 5/2329 |
| 2012/0249784 A1 | 10/2012 | Olson et al. | |

FOREIGN PATENT DOCUMENTS

| | | |
|---|---|---|
| CN | 105031935 A | 11/2015 |
| CN | 105049706 A | 11/2015 |
| CN | 105516583 A | 4/2016 |
| CN | 105519094 A | 4/2016 |
| WO | 2013127338 A1 | 9/2013 |
| WO | 2015106462 A1 | 7/2015 |

OTHER PUBLICATIONS

The World Intellectual Property Organization (WIPO) International Search Report and Written Opinion for PCT/CN2016/082898 dated Feb. 20, 2017, 7 pages.

* cited by examiner

*Primary Examiner* — Twyler L Haskins
*Assistant Examiner* — Angel L Garces-Rivera
(74) *Attorney, Agent, or Firm* — Anova Law Group, PLLC

(57) ABSTRACT

An image processing method includes obtaining an image frame through an imaging device over a period of time. The image frame includes a plurality of groups of pixels that are exposed to light at different time points within the period of time. The method further includes obtaining attitude information of the imaging device during the period of time, deriving positional state of an individual group of pixels in the plurality of groups of pixels based on the attitude information of the imaging device, and processing the image frame using the positional state.

20 Claims, 9 Drawing Sheets

SYSTEMS AND METHODS FOR ROLLING SHUTTER CORRECTION

CROSS-REFERENCE TO RELATED APPLICATION

This application is a continuation of International Application No. PCT/CN2016/082898, filed on May 20, 2016, the entire contents of which are incorporated herein by reference.

BACKGROUND

Most digital cameras today can enable video capture. Examples of consumer products include regular cameras, portable hand-held electronic devices, and other movable devices. Some of these consumer devices may use complementary metal oxide semi-conductor (CMOS)-based camera sensors. Most CMOS sensors use rolling shutter (RS) mechanism, as opposed to using a global shutter (GS), e.g., charge-coupled device (CCD)-based camera sensors. In a RS camera, detector rows are read and reset sequentially. Each row of the CMOS sensor is exposed during a slightly different time window. Since pixels are acquired at different points in time, motion of either the camera or the imaged object may cause geometrical distortion in the captured images. The geometric distortion may be exaggerated when the RS camera is coupled to a movable object, such as an unmanned aerial vehicle (UAV). In some instances, motion of the movable object may cause the resulting image to be tilted or skewed at an angle.

In some cases, video quality can be improved using mechanical systems. For example, mechanical image stabilization (MIS) systems can be used to actuate the camera lenses or CMOS image sensor, to compensate for small pan and tilt rotational motions. MIS systems can stabilize images substantially in real-time, and do not require significant computation (e.g., image processing) by the camera. However, MIS systems may be unable to compensate for rapid high frequency motions, such as those caused by vibrations from a vehicle engine. Moreover, MIS systems are generally not suitable for most consumer-based digital cameras due to their costs and form factor.

SUMMARY

Accordingly, a need exists to improve video quality and correct rolling shutter effect. The embodiments described herein can address the above need by providing an image processing method that can correct the rolling shutter effect in real-time without requiring post offline calculation or batch image processing. The image processing method can be used for different imaging devices and under different environmental conditions, and that can correct images for rolling shutter effect substantially in real-time as the images are being captured.

In one aspect, the present invention provides an apparatus for processing images. In practicing, the apparatus may comprise one or more processors that are, individually or collectively, configured to: obtain with the aid of an imaging device an image frame over a period of time, wherein the image frame comprises a plurality of groups of pixels that are exposed to light at different time points within the period of time; obtain attitude information of the imaging device to derive positional state of an individual group of pixels in the plurality of groups of pixels; and be concurrent with (a); and process the image frame using the derived positional state of (b).

In some embodiments, the individual groups of pixels are exposed to light consecutively and captured by an imaging device that is in motion. In some embodiments, the imaging device utilized in the apparatus comprises a video camera that is configured to shoot a video comprising a series of image frames with the aid of a rolling shutter. In some embodiments, the image frames to be processed by the image processing apparatus comprise an image of a target or a portion thereof that the target and the imaging device are moving relative to each other. In some embodiments, steps (a) and (b) performed by the apparatus occur concurrently at the frame in response to a trigger signal.

In some embodiments, the positional state of an individual group of pixels utilized in the apparatus can be derived from attitude information of the imaging device when exposing the corresponding group of pixels at a particular time point within the period of time. In some embodiments, the attitude information used to derive the positional state comprises attitude information including a pitch angle, a yaw angle, and/or a roll angle of the imaging device relative to a reference frame. Alternatively, the attitude information of the imaging device can comprise latitude coordinates, longitude coordinates, elevation, and/or a displacement of the imaging device.

In some embodiments, obtaining the attitude information of the imaging device in step (b) of the image processing apparatus comprises: obtaining a first set of positional data of the imaging device to derive positional state of an initial group of pixels that are exposed at a first time point; obtaining a second set of positional data of the imaging device to derive positional state of a final group of pixels that are exposed at a second time point, wherein the first set of positional data and the second set of positional data are retrieved from one or more sensors operably coupled to the imaging device; and calculating an individual set of positional data of the imaging device to derive positional state of an individual group of pixels that are exposed at a time point between the first time point and the second time point, wherein the individual set of positional data is calculated based on a linear/nonlinear simulation model.

In some embodiments, the positional data utilized for obtaining the positional state of the individual group of pixels is retrieved from one or more position sensors. In some embodiments, an inertial measurement unit (IMU) is configured to measure the attitude information of the imaging device by rigidly connected to the imaging device, where the IMU can comprise an accelerometer, a gyroscope, a compass, and/or GPS. Alternatively, the attitude information of the imaging device can be measured by a motion capture system located remotely from the imaging device, wherein the motion capture system is selected from the group consisting of a vision sensor, a barometer, an ultrasonic based navigation system, an indoor positioning system, and a lidar navigation/position.

In some embodiments, the individual group of pixels to be processed in step (c) is corrected using position data, wherein the individual group of pixels is compensated with a direction and a magnitude derived from the position data, and the direction for compensation is opposite to a translational shifting direction of the imaging device determined from the position information. In some embodiments, the translational shift is relative to a first group of pixels within the frame. Alternatively, the individual group of pixels can be corrected using a transformation matrix derived from attitude data or a combination of attitude data and position data. In some embodiments, the transformation matrix is determined from position data and attitude data corresponding to a first group of pixels and the position data and the attitude data corresponding to individual group of pixels.

In some embodiments, the imaging device utilized in the image processing apparatus is operably coupled to a movable object, wherein the desired movable object can be an aerial vehicle, a land vehicle, a vehicle traversing water body, a mobile phone, a tablet, a laptop, a wearable device, or a digital camera. In some embodiments, the movable object is stationary relative to the imaging device such that the attitude information can be obtained from one or more sensors that are configured to measure attitude information of the movable object. Alternatively, the movable object permits relative movement between the imaging device and the movable object. In this case, a first IMU operably coupled to the movable object is configured to measure the attitude information of the movable object, a second IMU operably coupled to the imaging device is configured to provide relative movement between the imaging device and movable object in conjunction with the first IMU. In some embodiments, the imaging device coupled to the movable object via being mounted on a stabilization system which is supported by the movable object, and the stabilization system permits the imaging device to rotate along one or more axes relative to the movable object. In this case, a first IMU operably coupled to the imaging device is configured the attitude information of the movable object, a second IMU provided on a frame of the stabilization system is rigidly connected to the imaging device, such that the attitude information of the imaging device are obtained by adjusting the attitude information from the first IMU using the attitude information from the second IMU.

In some embodiments, the one or more processors utilized in the apparatus are located on the movable object and/or the imaging device, wherein at least one processor for processing the image frame is located on the movable object, and at least one processor for adjusting apertures of the lens or zooming is located on the imaging device. Alternatively, the one or more processors are located remotely from the movable object and on an external device (e.g., a remote terminal, a remote controller, a display device). In some embodiments, the video shot is output for display on an external device located remotely from the video camera concurrently with shot by the rolling shutter video camera. In some embodiments, a processed image frame can be output prior to or concurrently with completing obtaining one or more subsequent image frames of the video. In some embodiments, one or more groups of pixels of an image frame can be processed prior to or concurrently with obtaining one or more subsequent image frames of the video. In some embodiments, the individual group of pixels comprises a predetermined number of columns or rows of pixels of the image frame. In some embodiments, a time interval between exposing two subsequent groups of pixels is in a range from about 1 μs to about 50 μs, and a time interval between shooting two subsequent image frames with the aid of the imaging device is in a range from about 5 ms to about 50 ms.

In a separate yet related aspect, the present invention provides a method for processing images. In practicing, the method may comprise: (a) obtaining with the aid of an imaging device an image frame over a period of time, wherein the image frame comprises a plurality of groups of pixels that are exposed to light at different time points within the period of time; (b) obtaining attitude information of the imaging device to derive positional state of an individual group of pixels in the plurality of groups of pixels, and be concurrent with (a); and (c) processing the image frame using the derived positional state of (b).

In another aspect, the present invention provides a method for processing an image frame comprising a plurality of pixels. In practicing, the method may comprise: processing, with the aid of one or more processors that individually or collectively, the image frame being captured by an imaging device operably coupled to a movable object, wherein individual groups of the pixels of said plurality of pixels are exposed at different time points, and wherein said processing (1) takes place on-board of the movable object, and (2) uses attitude information of the imaging device and/or the movable object.

In some embodiments, the image processing method may take place concurrent with capturing the image frame or after capturing of the image frame. In some embodiments, the movable object utilized in the method is in motion, where the desired movable object can be an aerial vehicle, a land vehicle, a vehicle traversing water body, a mobile phone, a tablet, a laptop, a wearable device, or a digital camera. In some embodiments, the image processing method further comprises obtaining attitude information of the imaging device at which an individual group of pixels are exposed to derive the positional state of the individual group of pixels. In some embodiments, the attitude information of the imaging device comprises attitude information including a pitch angle, a yaw angle, and/or a roll angle of the imaging device relative to a reference frame, or alternatively the attitude information may comprise including latitude coordinates, longitude coordinates, elevation, and/or a displacement of the imaging device.

In some embodiments, the attitude information of the imaging device is retrieved from one or more sensors that are rigidly connected to the imaging device. In some embodiments, the one or more sensors can be attitude measuring unit which comprises an IMU. In some embodiments, the one or more sensors are operably coupled to the movable object and configured to measure attitude information of the movable object, wherein the movable object permits relative movement between the imaging device and the movable object, and wherein the attitude information of the imaging device is obtained by compensating the attitude information of the movable object based upon the relative movement between the movable object and the imaging device.

In some embodiments, the imaging device is mounted on a stabilization system which is supported by the movable object, wherein the stabilization system permits the imaging device to rotate along one or more axes relative to the movable object, and wherein the movable object is operably coupled to a first IMU configured to measure attitude information of the movable object. In this case, the attitude information of the imaging device are obtained by compensating the attitude information of the movable object along one or more rotational axes, and wherein rotation information along one or more rotational axes is provided by one or more motors of the stabilization system, further a second IMU is provided on a frame of the stabilization system which is rigidly connected to the imaging device, and wherein the attitude information are obtained by adjusting the attitude information from the first IMU using the attitude information from the second IMU.

In some embodiments, the individual group of pixels can be processed based on individual or combination of position data and attitude data. In some embodiments, the one or more processors for processing the image frame are located on-board of the movable object or the imaging device, wherein at least one processor for processing the image frame is located on the movable object, and at least one processor for adjusting apertures of the lens or zooming is located on the imaging device. In some embodiments, the individual group of pixels to be processed may comprise a predetermined number of columns or rows of pixels of the image frame, wherein the image frame is obtained from the imaging device with aid of a rolling shutter, such that a plurality of groups of pixels are exposed to light at different time points within the period of time. In some embodiments, the image processing method further comprises obtaining the attitude information of the imaging device at which an individual group of pixels are exposed and deriving positional state of the individual group of pixels based upon the obtained attitude information of the imaging device.

In a separate yet related aspect of the invention, an apparatus for processing an image frame comprising a plurality of groups of pixels is provided. In practicing, the apparatus may comprise one or more processors that are, individually or collectively, configured to: process the image frame being captured by an imaging device operably coupled to a movable object, wherein individual groups of the pixels of said plurality of pixels are exposed at different time points, and wherein said processing (1) takes place on-board of the movable object, and (2) uses attitude information of the imaging device and/or the movable object.

In another aspect of the invention, a method of shooting a video comprising a series of image frames may be provided. In practicing, the method may comprise: (a) taking the video by an imaging device operably coupled to a movable object, wherein an individual image frame of said series is generated by exposing a portion of photosensors corresponding to a portion of pixels in said image frame; (b) assessing, with the aid of one or more processors that individually or collectively, attitude information of said imaging device and/or the movable object; and (c) adjusting, on-board of said imaging device and/or said movable object, at least one of the image frames in said series using the assessed attitude information.

In some embodiments, the method further comprises a step of (d) out-putting said at least one of the adjusted image frames or a video comprising a series of adjusted image frames from said imaging device or said movable object to an external device. In some embodiments, the method of shooting a video may further comprises out-putting an individual adjusted image frame prior to or concurrent with taking and/or adjusting one or more subsequent image frames of the video by the imaging device. In some embodiments, in step (c) of the method only a portion of pixels in an individual image frame is adjusted at a time, and in some instances, adjusting an individual group of pixels of a particular image frame concurrent with exposing a portion of the photosensors corresponding to one or more subsequent groups of pixels within the particular image frame. In some embodiments, in step (a) of the method, different portions of the photosensors are exposed to light at different time points within a period of time for exposing all of the photosensors corresponding to all pixels on an individual image frame. In some embodiments, step (b) of the method may comprise: obtaining a first set of positional data of the imaging device to derive positional state of an initial group of pixels of a particular image frame that are exposed at a first time point; obtaining a second set of positional data of the imaging device to derive positional state of a final group of pixels of the particular image frame that are exposed at a second time point, wherein the first set of positional data and the second set of positional data are retrieved from one or more sensors operably coupled to the imaging device and/or the movable object; and calculating an individual set of positional data of the imaging device to derive positional state of an individual group of pixels of the particular image frame that are exposed at a time point between the first time point and the second time point, wherein the individual set of positional data is calculated based on a linear simulation model.

In some embodiments, the attitude information comprises position information including latitude coordinates, longitude coordinates, elevation, and/or a displacement of the imaging device and/or the movable object, and the attitude information can also comprise attitude information including a pitch angle, a yaw angle, and/or a roll angle of the imaging device and/or the movable object relative to a reference frame. In some embodiments, the attitude information used for adjusting an individual group of pixels can be an individual or a combination of position data and attitude data. In some embodiments, the one or more processors are located on the movable object and/or the imaging device, and at least one processor for processing the image frame is located on the movable object, and at least one processor for adjusting apertures of the lens or zooming is located on the imaging device.

In a separate yet related aspect of the invention, an apparatus for shooting a video comprising a series of image frames may be provided. In practicing, the apparatus may comprise one or more processors that are, individually or collectively, configured to: take the video by an imaging device operably coupled to a movable object, wherein an individual image frame of said series is generated by exposing a portion of photosensors corresponding to a portion of pixels in said image frame; assess, with the aid of one or more processors that individually or collectively, attitude information of said imaging device and/or the movable object; and adjust, on-board of said imaging device and/or said movable object, at least one of the image frames in said series using the assessed attitude information.

It shall be understood that different aspects of the invention can be appreciated individually, collectively, or in combination with each other. Various aspects of the invention described herein may be applied to any of the particular applications set forth below. Other objects and features of the present invention will become apparent by a review of the specification, claims, and appended figures. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Embodiments disclosed herein provide apparatuses and methods for processing images to correct rolling shutter effect. It shall be understood that different aspects of the invention can be appreciated individually, collectively, or in combination with each other. Various aspects of the invention described herein may be applied to any of the particular applications set forth below or for any other types of remotely controlled vehicles or movable objects.

In one aspect, the present invention provides a method for processing image frames. In practicing, an image frame may be captured over a period of time using an imaging device. The image frame may comprise a plurality of groups of pixels that are exposed to light at different time points within the period of time. state of an individual group of pixels may be derived by attitude information of the imaging device concurrently with obtaining of image frames. Accordingly, the image frame may be processed using the derived positional states of groups of pixels.

Rolling shutter effect can be corrected in real-time using the methods, systems and devices provided herein. It shall be understood that different aspects of the invention can be appreciated individually, collectively, or in combination with each other. Various aspects of the invention described herein may be applied to any of the particular applications set forth below or for any other types of remotely controlled vehicles or movable objects.

Thus, the present invention provides embodiments of systems, devices, and/or method for processing images to correct rolling shutter effect.

Figure 1:
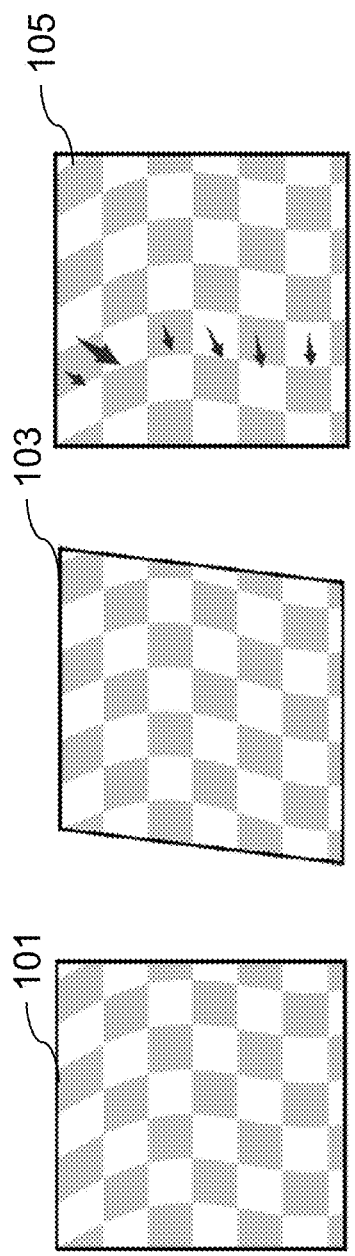
FIG. 1 depicts an exemplary image frame captured by an imaging device with aid of a rolling shutter along with an illustrative rolling shutter effect.

FIG. 1 depicts an exemplary image frame captured from an imaging device with aid of a rolling shutter along with an illustrative rolling shutter effect. In a rolling shutter imaging device, pixels of image sensor are read top-to-bottom, left-to-right, such that the data read at the top of the frame is acquired at a point in time different from the time when the data at the bottom of the frame is acquired. Accordingly, when the imaging device is moving (e.g., panning) during the rolling shutter sequence, the resulting image may appear tilted or skewed. Imaging device motion during the exposure time may influence the warping of the image. For example, if the imaging device sways from side to side while the shutter is rolling, then the output image may be warped as shown in 101. A global linear transformation of the image cannot fully rectify the warping, as shown in 103, in that the image still has a distortion due to an effect of the imaging device's 3D motion projected at each row 105 in the image plane.

An imaging device as described herein may serve as an image capture device. An imaging device may include complementary metal oxide semiconductor (CMOS) sensors that generate electrical signals in response to wavelengths of light. The resulting electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor. The image sensor may employ a rolling shutter, where image rows or columns are read out and reset sequentially.

In some embodiments, the imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, and the like.

The imaging device may capture an image frame or a sequence of image frames at a specific image resolution. In some embodiments, the image frame resolution may be defined by the number of pixels in a frame. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution. Pixels of camera may be square. In other embodiments may take into account non-square pixels or other optical distortions.

The imaging device may capture a sequence of image frames at a specific capture rate. In some embodiments, the sequence of images may be captured at standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. illumination brightness).

Figure 2:
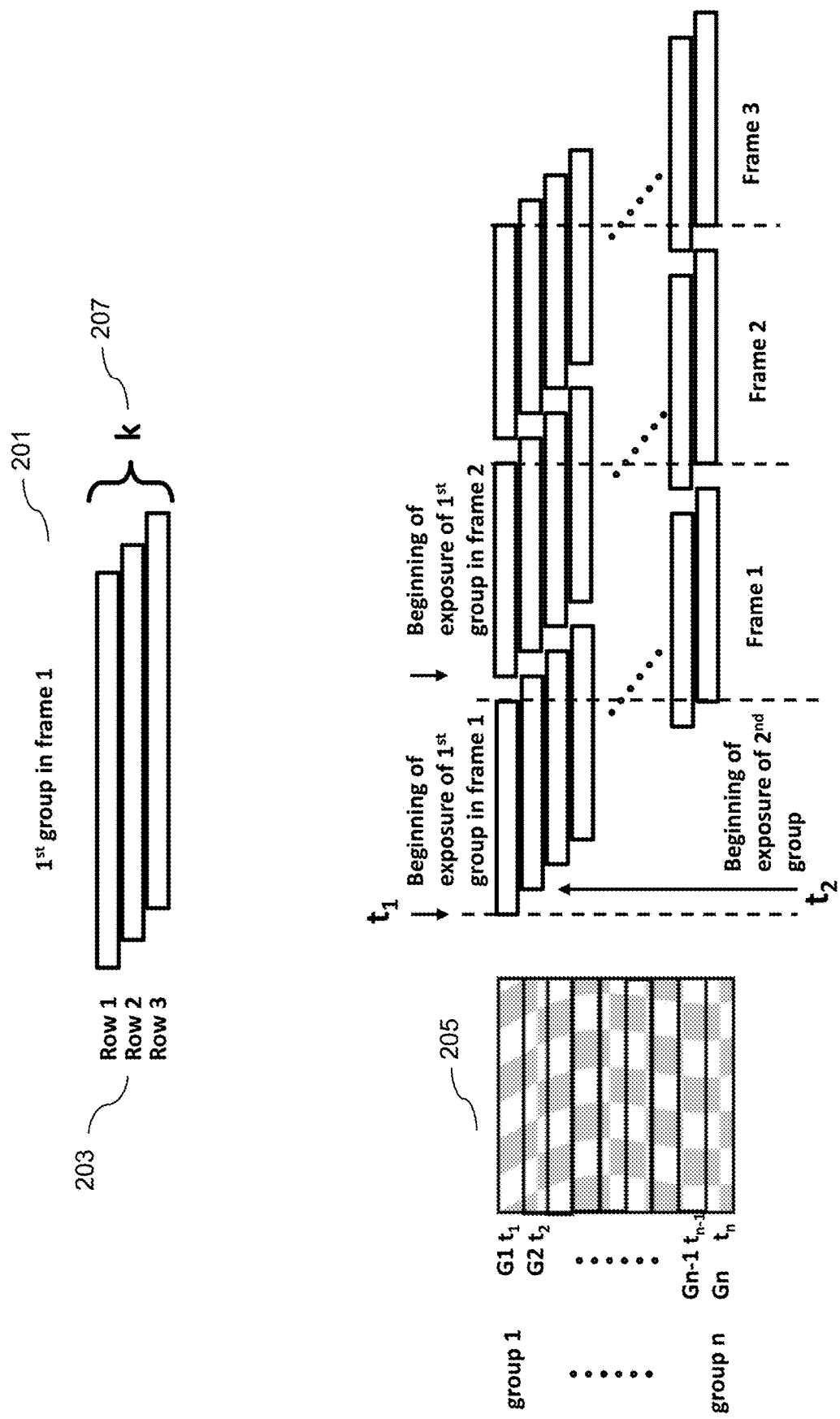
FIG. 2 depicts an exemplary image frame, contained therein a plurality of groups of pixels, in accordance with some embodiments.

FIG. 2 depicts an exemplary image frame containing a plurality of groups of pixels. The image frame may be captured by a camera comprising a rolling shutter, such that the image frame may comprise a plurality of groups of pixels. The groups of pixels may be exposed to light at consecutive time points. Rolling shutter may be vertical or horizontal. In the example of FIG. 2, an image frame 205 comprises a plurality of image rows 203. Each image row may be exposed at a slightly different time. The delay of exposure time for adjacent rows may be determined by exposure duration of a frame and total number of rows in the frame. For example, for an image frame containing 1080 rows and captured at a rate of 0.0001 second, delay between two adjacent rows may be approximately 0.093 µs (0.0001/1080 second). One or more rows may be grouped together as a group of pixels 201. In the example of FIG. 2, image frame 205 may be divided into n groups, where n may be any integer. The number of rows 207 contained in each group may be determined by the total number of rows of the frame and n. Therefore, exposure time of each group may be determined by the frame rate and number of groups. In some instances, the exposure time of each group may range from 0.093 µs to 10 s. Accordingly, difference between adjacent time points associated with two adjacent groups may range from 0.093 µs to 10 s. In some other instances, the exposure time of each group may be less than 0.093 µs or greater than 10 s. Accordingly, the difference between adjacent time points associated with two adjacent groups may depend on the exposure time.

In some embodiments, a group of pixels may refer to one or more rows of pixels 201. In some alternative embodiments, a group of pixels may refer to one or more columns of pixels. Given that the time difference between adjacent groups is small (e.g., 0.093 µs), all the pixels within a group may be associated with the same time point. For example, the first group of a frame may be associated with time $t_1$, the second group may be associated with time $t_2$. The time point associated with an individual group may be the time at which the first row within the group is captured. In other examples, the time point associated with an individual group can be the time at which any row within the group is captured.

As illustrated in FIG. 2, during the period of time from the top row captured until the bottom row, each group of pixels is exposed to light and read-out sequentially. Groups of pixels within a frame may be exposed from in various orders (e.g., top to bottom, bottom to top, left to right or right to left). Exposure time for each group of pixels need not be equal. For example, a time difference between $t_1$ and $t_2$ need not be equal to a time difference between $t_2$ and $t_3$.

In some embodiments, the imaging device may be used for capturing image frames, such that the image frame(s) may comprise an image of a target or a portion of the target. The target may have a relative movement with respect to a coordinate of the imaging device over a period time while at least one group of pixels are being captured. The relative movement may be in the form of translational movement, rotational movement, curvilinear motion of the device, changing orientation (e.g., attitude, pitch, roll, yaw), or any combination of the above.

In some embodiments, the imaging device may be in motion. Motion of the imaging device may include translational movement of the device, rotational movement of the device, curvilinear motion of the device, changing orientation (e.g., attitude, pitch, roll, yaw) of the device, zoom-in or zoom-out (magnification) of the device, or any combination of the above. Motion of the imaging device may be of high-frequency such that the frequency may be high enough to cause rolling shutter effect. In some embodiments, the imaging device may be operably coupled to a movable object, such that motion of the movable object may affect the motion of the imaging device. Details about the movable object and relative movement between the movable object and the imaging device is described later herein.

An individual group of pixels to be processed for correcting rolling shutter effect may be associated with a positional state. The positional state of an individual group of pixels may be represented as a rotation matrix R(t), where R(t)∈SO(3). The rotation matrix may be a function of time which is associated with a group of pixels. The rotation matrix R(t) may contain an orientation of the imaging device corresponding to a time at which an associated group of pixels is captured. In some embodiments, quaternions may be used to represent rotations. It is noted that various ways can be used to represent rotations as long as the representations can facilitate smooth interpolation.

In some embodiments, the individual group of pixels may be corrected using a transformation matrix determined from attitude data as described herein.

Figure 3:
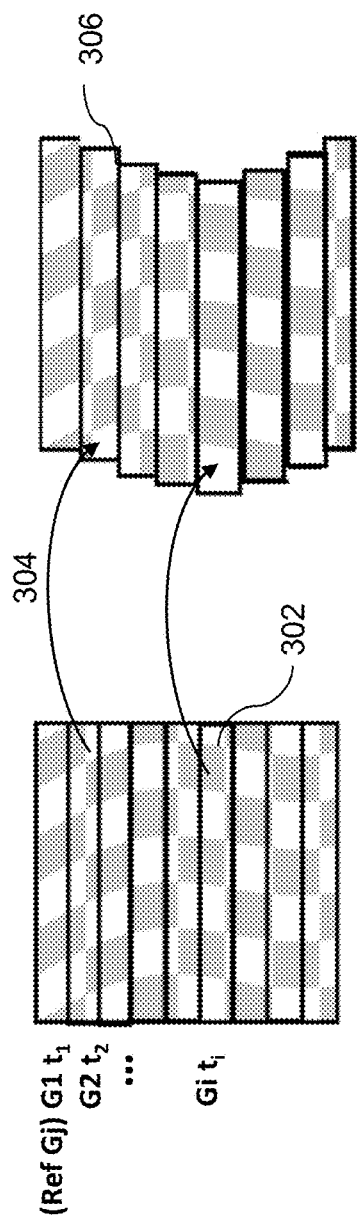
FIG. 3 illustrates an exemplary group-by-group based rolling shutter correction process, in accordance with some embodiments.

Referring to FIG. 3, a relationship in terms of image plane coordinates of two points imaged in two different frames may be presented by the following example equation:

$$x_j = KR(t_j)R(t_i)^T K^{-1} x_i$$

where K is an intrinsic matrix of camera. The matrix K may contain parameters of the origin of the camera axis in the image plane and the focal length. The camera's focal length may be obtained from factory standards of camera (e.g., 28 mm, 106 mm, etc). In a planar image plane, the term $KR(t_j)R(t_i)^T K^{-1}$ may represent a relatively translational shift between image points imaged at time i and j.

$KR(t_j)R(t_i)^T K^{-1}$ is the transformation matrix 304 to map image point $x_i$ to a new image plane coordinate $x_j$. As illustrated in FIG. 3, when the second term of transformation matrix $R(t_i)$ represents the positional state of group Gi 302, and the first term $R(t_j)$ represents the positional state of a reference group captured at $t_j$, the resulting transformation of group Gi is a translation with respect to the reference group position. It should be appreciated that $t_i$ and $t_j$ may correspond to any successive Gi (group i) and Gj (group j) within a frame, where Gi may be captured at a later time point from the reference group Gj. Consequently, after applying the above transformation matrix, coordinates of Gi is mapped to a new position, where the new position and image position of the reference group Gi share the same camera orientation $R(t_j)$. FIG. 3 illustrates an example of correcting groups of pixels in the translational direction having the first group of pixels as reference. For example, G2 could be translated to be aligned with respect to G1 by a transformation 304. A new position of G2 306 in row direction may be computed by the following example equation:

$$x'_2 = KR(t_1)R(t_2)^T K^{-1} x_2$$

where $R(t_2)$ is the orientation matrix corresponding to G2, $R(t_1)$ is the orientation matrix corresponding to G1. However, it should be understood that the reference group could be any group within the frame (e.g., the middle group) and there may be no mathematical relationship among the different groups.

In some embodiments, the transformation matrix $KR(t_i)R(t_j)^T K^{-1}$ used to correct an individual group with respect to a reference group may model camera orientation only in terms of rotations, or primarily in terms of rotations. The transformation matrix can be determined based on the attitude information associated with the reference group of pixels and the group of pixels to be corrected.

The positional state of a group of pixels may be derived from attitude information of the imaging device at the time that the group of pixels is captured. The attitude information of the imaging device may at least comprise a pitch angle, a yaw angle, and/or a roll angle of the imaging device with respect to a reference frame. The reference frame may be associated with a global coordinate frame. The angles described above may be computed by integrating angular velocity of the imaging device. The angular velocity of the imaging device may comprise a rotational direction and a rotational speed of the imaging device. In an alternative approach, the orientation angles can be derived by a double-integration of an angular acceleration data.

In other embodiments, the transformation matrix used to correct an individual group with respect to a reference group may model camera orientation in terms of rotations and translations/displacement. In this case, the transformation matrix may be determined based on the attitude data in conjunction with a position data associated with the reference group of pixels and the group of pixels to be corrected. The transformation matrix may further comprise a term representing a translation motion of the imaging device. Transformation matrix may be presented as $$KR(t_i)D(t_i)D(t_j)^{-1}R(t_j)^T K^{-1}$$

where $D(t_i)$ is a translation estimation matrix at time $t_i$, $D(t_j)^{-1}$ is an inverted translation matrix at time $t_j$.

In some embodiments, the attitude information of imaging device may comprise at least position information, including latitude coordinates, longitude coordinates, elevation, and/or a displacement of the imaging device. The displacement of the imaging device may be computed by integrating a linear velocity. The linear velocity of the imaging device may comprise a linear direction and a linear speed of the imaging device. In an alternative approach, displacement of the imaging device may be derived from a double-integration of a linear acceleration of the imaging device.

In some embodiments, an individual set of positional data of the imaging device may be retrieved from one or more sensors. Various selections of sensors can be used to derive positional data of the imaging device. In some embodiments, positional sensors may be used to refer to one or more sensors as described herein. In some instances, the positional sensors may comprise motion sensors so that the positional data of the imaging device may be derived by an integration of the linear/angular velocity measured by the motion sensors. In other instances, the positional sensors may comprise absolute/relative position sensors so that the attitude and positional data can be derived without integration. In some embodiments, the absolute position of the imaging device may be determined using a range-finding and/or locating device. The range-finding and/or locating device may be a location sensor (e.g., Global Positioning System (GPS) device, mobile device transmitters enabling location triangulation. In some embodiments, the positional data of imaging device may be retrieved from inertial sensors (e.g., accelerometers, gyroscopes, inertial measurement units (IMUs)), attitude sensors (e.g., compasses), pressure sensors (e.g., barometers), and/or field sensors (e.g., magnetometers, electromagnetic sensors). In some embodiments, the positional data of the imaging device may be retrieved from a motion capture system located remotely from the imaging device. In some embodiments, the motion capture system may be selected from the group consisting of a vision sensor, a barometer, an ultrasonic based navigation system, an indoor positioning system, and a lidar navigation/position.

In some embodiments, an inertial measurement unit (IMU) may be configured to measure the attitude information (e.g., attitude) of the imaging device. In practice, when a gyroscope is used for measuring attitude information, gyroscope drift may be inevitable. Since the gyroscope drift can significantly compromise measurement accuracy, various methods have been employed to compensate for the drift. One way to accomplish gyroscope correction is to run a calibration operation to determine the drift value. Alternatively, gyroscope drift can be eliminated by applying a filter to one or more sets of positional data in real-time.

In the present invention, gyroscope drift can be eliminated by implementing a filter (e.g., Kalman filter, complimentary filter) with aid of accelerometers, compasses or GPS. In some embodiments, a complimentary filter may be used to overcome gyroscope drift based on accelerometer data and gyroscope data. An orientation angle of the imaging device at a sampling time which is free of gyroscope drift may be obtained based on the following equation $$\theta_{i+1} = \alpha(\theta_i + \omega_{i+1}\Delta t) + (1-\alpha)\theta_{i_{acc}}$$

where $\theta_{i+1}$ is the orientation angle of imaging device at current gyroscope sample time, $\theta_i$, is the orientation angle of imaging device at last gyroscope sample time, $\alpha$ is a number ranging from 0 to 1, $\omega_{i+1}$ is the gyroscope output angular velocity at current gyroscope sample time, $\theta_{i_{acc}}$ is the orientation angle of imaging device derived from accelerometer data. $\Delta t$ is the sampling time which may be corresponding to the exposure rate of groups of pixels. It should be noted that the complimentary filter may have different orders, as in the presented example a first order is used, however higher order may be adopted for improved filtering result. In other embodiments, a Kalman filter may be used to minimize gyroscope drift by merging accelerometer data and gyroscope data. In yet other embodiments, various combination of sensor fusion can be used for correcting gyroscope drift, such as gyroscope combined with compass, gyroscope combined with GPS, gyroscope combined with GPS and compass.

In some embodiments, the IMU may be operably coupled to the imaging device. The IMU may be located on a central body of the movable object or on a peripheral part of the imaging device (e.g., on a carrier coupled to the imaging device). An IMU of the present disclosure can be situated on any suitable portion of an imaging device, such as above, underneath, on the side(s) of, or within a body of the imaging device. The IMU may be located on a center or off-center of the imaging device. The IMU can be coupled to the imaging device via a rigid connection, such that the IMU does not move relative to the portion of the imaging device to which it is attached. Accordingly, the coordinate frames of IMU and imaging device are relatively stationary to each other. However, it is noted that the coordinate frame of IMU may or may not be aligned with the coordinate frame of the imaging device. For example, there may be a fixed angle between the IMU frame and imaging device frame. The angle can be any number as long as it is a constant number. The coupling can be a permanent coupling or non-permanent (e.g., releasable) coupling. Suitable coupling methods can include adhesives, bonding, welding, and/or fasteners (e.g., screws, nails, pins, etc.). Optionally, the IMU can be integrally formed with a portion of the imaging device. The IMU may be operably coupled with a portion of the imaging device (e.g., processing unit, control system, data storage).

In some embodiments, attitude information of the imaging device may be obtained at the time an individual group of pixels are exposed such that obtaining of positional data and image data occur concurrently. The positional state of each individual group may be based on a set of direct sensor readings. A set of attitude information associated with a sequence of groups may be retrieved from a selection of sensors. For example, an image frame may contain N groups of pixels. Accordingly, N sets of positional data may be obtained sequentially at the time points each group is captured. Further, N orientation matrices can be computed from the positional data for the image transformation operation.

In other embodiments, a positional state of each individual group of pixels may be obtained by interpolating (linear or non-linear) a series of positional states between a first positional state and a second positional state. The first positional state may correspond to an initial group of pixels captured in a frame; the second positional state may correspond to the final group of pixels captured in the same frame. However, it should be noted that the first and second group of pixels may be any two subsequent groups in the frame. In some embodiments, at least one group is exposed between the two groups. Parameters of the positional states may be represented by quaternions or rotation matrices. Parameters in either representation may be able to facilitate a smooth interpolation. Various methods may be used for interpolation, such as linear or cubic interpolation (e.g., spherical linear interpolation or squad). A set of positional states may be computed between the first and second positional states and further be used for computing the transformation matrices.

In order to correct rolling shutter effect, an orientation of the imaging device at the time a particular group of pixels are exposed to light may be needed. In practice, the image data and positional data are not captured simultaneously which leads to a delay or time offset between the image data and the corresponding positional data. Various methods have been employed to determine the time offset. One way to resolve the time offset is by performing a post offline calibration. However this approach may not be applicable when a real-time image processing is desired. In the present invention, real-time image processing can be accomplished by utilizing a synchronization unit to eliminate the time offset between the image data and the positional data. In some embodiments, the synchronization unit may be hardware that allows an electric trigger signal to be emitted from a camera controller to a processor. In some embodiments, the electric signal may be the same signal that triggers a camera shutter. The synchronization unit may be incorporated with the camera processor such as the shutter controller. The synchronization unit may be implemented in any or a combination of the following technologies, which are all well known in the art: discrete electronic components, discrete logic circuits having logic gates for implementing logic functions upon data signals, an application specific integrated circuit having appropriate logic gates, a programmable gate array(s), a field programmable gate array (FPGA), etc. The synchronization unit is not limited to any particular firmware, or software configuration. In some embodiments, the synchronization unit may be programmed to allow the trigger signal generated at the rate of camera shutter or a lower rate of the camera shutter. For example, the trigger signal may be generated at the exposure of each row of camera sensor (e.g, A/D clock). Alternatively, the signal may be generated at every number of rows (e.g., 5 rows, 10 rows, 20 rows, etc). The processor may be configured to read positional data from the motion/location sensors in response to the electric trigger signal. As described later herein, the processor may include an image correcting unit that is configured to process image data based on the positional data. Greater detail referring to the image correcting unit or image analyzer is described later in FIG. 4.

In another aspect, the present invention provides an apparatus for processing images. In practicing, the apparatus may comprise one or more processors that are, individually or collectively, configured to: obtain with the aid of an imaging device an image frame over a period of time, wherein the image frame comprises a plurality of groups of pixels that are exposed to light at different time points within the period of time; obtain attitude information of the imaging device to derive positional state of an individual group of pixels in the plurality of groups of pixels; and be concurrent with (a); and process the image frame using the derived positional state of (b).

Figure 4:
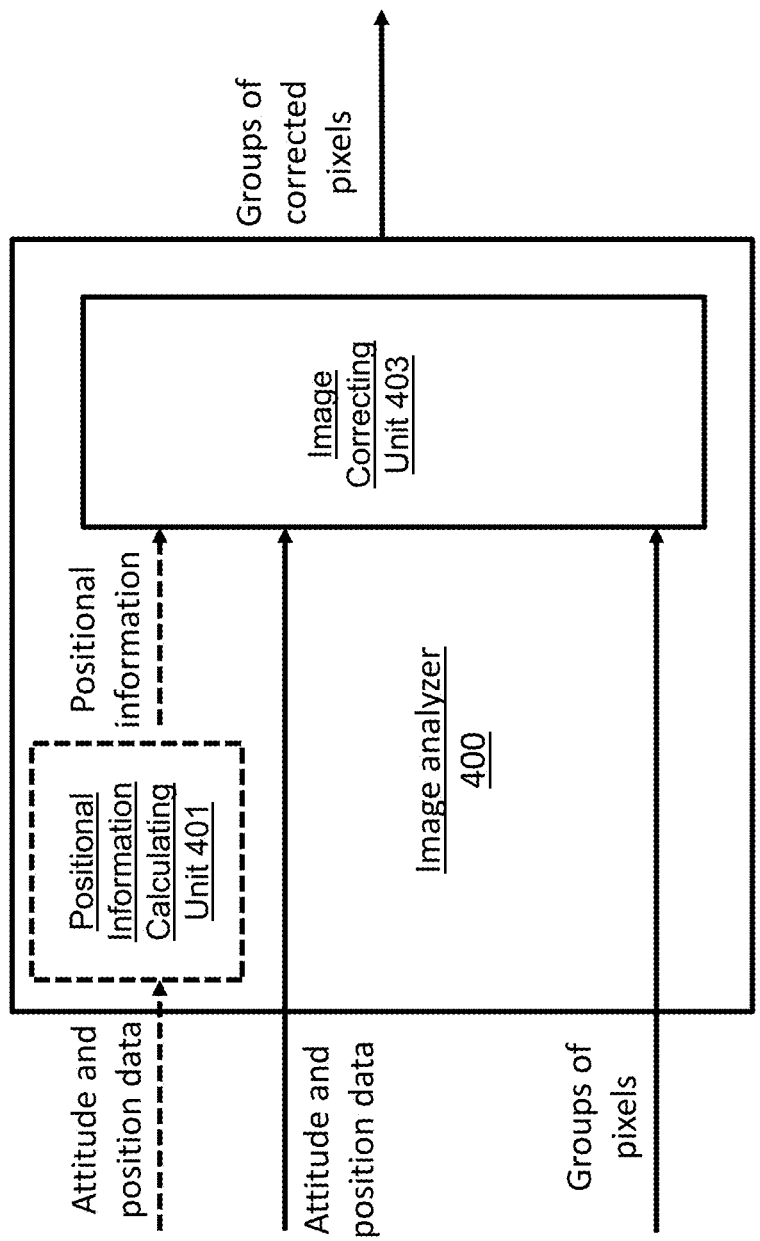
FIG. 4 illustrates a block diagram of an exemplary image analyzer, in accordance with some embodiments.

FIG. 4 illustrates a block diagram of an exemplary image analyzer 400, in accordance with some embodiments. The image analyzer 400 may comprise a attitude information calculating unit 401 and an image correcting unit 403. The image correcting unit 403 may be configured to receive a plurality of groups of pixels captured by an imaging device, where the groups of pixels are exposed to light subsequently within a period of time. Concurrently, the attitude information calculating unit 401 may receive a set of attitude and/or position data captured by positional sensors associated with the plurality of groups of pixels. Subsequently, the attitude information calculating unit 401 may calculate the positional state for each group of pixels. The image correcting unit 403 may process each group of pixels based on the associated positional state and output groups of corrected pixels. In some embodiments, the image analyzer 400 can be implemented as a software program executing in a processor and/or as hardware that process a plurality of image frames to correct for rolling shutter effect. In some embodiments, the image correcting unit 401 may receive the attitude and position data directly from the positional sensors for image processing.

In some embodiments, the attitude information calculating unit 401 may have one or more processors, such as a programmable processor (e.g., a central processing unit (CPU) or a microcontroller). For example, the attitude information calculating unit may include a field programmable gate array (FPGA) and/or one or more ARM processors. The attitude information calculating unit 401 may be operatively coupled to a non-transitory computer readable medium. The non-transitory computer readable medium can store logic, code, and/or program instructions executable by the attitude information calculating unit for performing one or more steps. The non-transitory computer readable medium can include one or more memory units (e.g., removable media or external storage such as an SD card or random access memory (RAM)). In some embodiments, data from the motion or location sensors can be directly conveyed to and stored within the memory units of the non-transitory computer readable medium. The memory units of the non-transitory computer readable medium can store logic, code and/or program instructions executable by the attitude information calculating unit to perform any suitable embodiment of the methods described herein. For example, the attitude information calculating unit can be configured to execute instructions to calculate attitude information of the imaging device at the time each individual group of pixels is captured as discussed herein. The memory units can store position and attitude data from the motion and location sensors to be processed by the attitude information calculating unit. In some embodiments, the memory units of the non-transitory computer readable medium can be used to store the processing results produced by the attitude information calculating unit.

In some embodiments, the image correcting unit 403 may have one or more processors, such as a programmable processor (e.g., a central processing unit (CPU) or a microcontroller). The processor for processing image data may be operatively coupled to the pre-processing unit and attitude information calculating unit (e.g., via a general purpose memory controller (GPMC) connection). Any suitable means of transmitting image data can be used, such as wired or wireless transmission. The image correcting unit can be operatively coupled to a memory. The memory may include transitory and/or non-transitory storage media configured to store data, and/or logic, code, and/or program instructions executable by the image correcting unit for image processing. The memory may include one or more memory units (e.g., removable media or external storage such as an SD card or random access memory (RAM)). The memory units can store image data received from the imaging sensor or positional data received from the motion and location devices. In some embodiments, the memory may be used to store the processing results produced by the image correcting unit. In some embodiments, the processor for calculating attitude information may be separate from the processor for correcting images. In some embodiments, the processor for calculating attitude information may be the same processor for correcting images.

In a separate yet related aspect, the present invention provides a method for processing images. In practicing, the method may comprise: (a) obtaining with the aid of an imaging device an image frame over a period of time, wherein the image frame comprises a plurality of groups of pixels that are exposed to light at different time points within the period of time; (b) obtaining attitude information of the imaging device to derive positional state of an individual group of pixels in the plurality of groups of pixels, and be concurrent with (a); and (c) processing the image frame using the derived positional state of (b).

Figure 5:
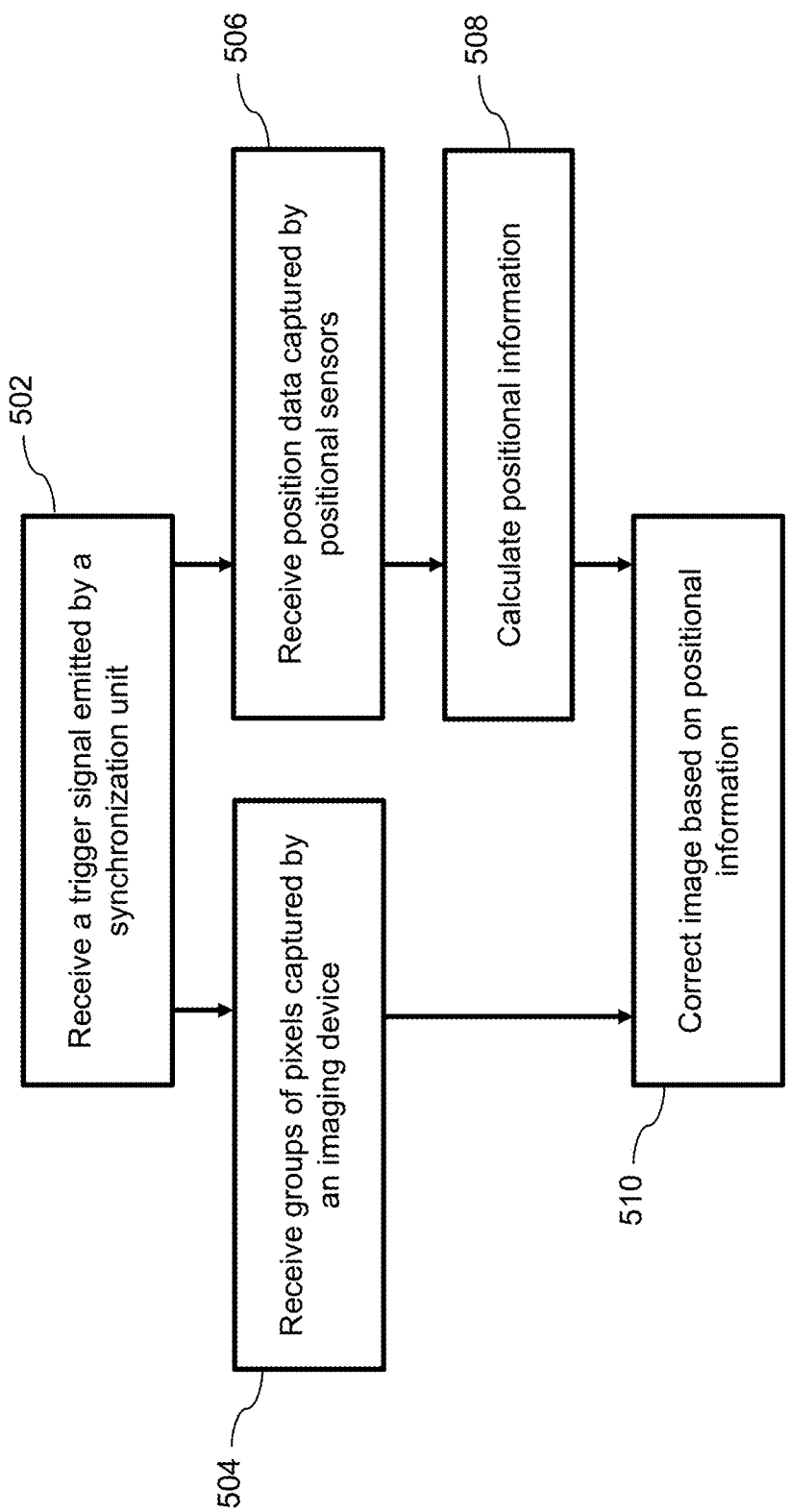
FIG. 5 illustrates an exemplary process for processing an image captured by an image capture device, in accordance with some embodiments.

FIG. 5 illustrates an exemplary process for processing an image captured by an imaging device, in accordance with embodiments. An imaging device has been previously described herein. In some embodiments, the imaging device may comprise one or more processors (e.g., FPGA) coupled to one or more imaging sensors embedded in the imaging device. The processors may be embedded in an imaging device or be separate from the imaging device. The processors may include algorithms for controlling parameters (e.g., exposure, gain) of the imaging device, or adjust the aperture and zooming of the lens. The algorithms for controlling parameters of the imaging device may be conventional AEC/AGC algorithms. The processors may output a reference exposure and gain configuration to be adapted by the imaging device for the acquisition of images. For example, the imaging device may vary the exposure time and amount by varying the shutter time or aperture size.

In some embodiments, obtaining attitude information of the imaging device may be concurrent with obtaining image frame from the imaging device. In the present invention, a trigger signal may be utilized to synchronize step (a) and (b) included in the image processing method. As illustrated in FIG. 5, in step 502, a trigger signal may be received simultaneously by an imaging device and one or more processors (e.g, attitude information calculating unit and/or image correcting unit described in FIG. 4). The trigger signal may be emitted by a synchronization unit. In some embodiments, the trigger signal may be the same signal that triggers a camera shutter. In some embodiments, the synchronization unit may be incorporated with the camera processor such as the shutter controller. The synchronization unit may be implemented in any or a combination of the following technologies, which are all well known in the art: discrete electronic components, discrete logic circuits having logic gates for implementing logic functions upon data signals, an application specific integrated circuit having appropriate logic gates, a programmable gate array(s), a field programmable gate array (FPGA), etc. The synchronization unit is not limited to any particular firmware, or software configuration. In some embodiments, the synchronization unit may be programmed to allow the trigger signal generated at the rate of camera shutter or at a lower rate of the camera shutter. For example, the trigger signal may be generated at exposure of each row of camera sensor (e.g, A/D clock), alternatively the trigger signal may be generated every number of rows (e.g., 5 rows, 10 rows, 20 rows, etc). The one or more processor may be configured to read positional data from motion/location sensors in response to the electric trigger signal.

In step 504, the imaging device may be configured to receive a group of pixels in response to the trigger signal. In some embodiments, the image data captured by the imaging device can be pre-processed by a pre-processing unit. The pre-processing unit can include any hardware, software, or a combination thereof. In some embodiments, a pre-processing unit may comprise a field-programmable gate array (FPGA), application-specific integrated circuit (ASIC), application-specific standard product (ASSP), digital signal processor (DSP), central processing unit (CPU), graphics processing unit (GPU), vision processing unit (VPU), complex programmable logic devices (CPLD), and the like. In some embodiments, the processor may be on-board a movable object (e.g., a UAV) or an embedded processor carried by the imaging device. Alternatively, the processor may be an off-board processor separated from the imaging device (e.g., at a ground station, communicating with a camera). The pre-processing unit can be operatively coupled to the imaging device to pre-processing of the raw image data before the image data is processed to correct for rolling shutter effect. Examples of tasks performed by the pre-processing unit can include re-sampling to assure the correctness of the image coordinate system, noise reduction, contrast enhancement, scale space representation, and the like. In some embodiments, at least one processor for processing the image frame is located on the movable object, and at least one processor for adjusting apertures of the lens or zooming is located on the imaging device.

In step 506, one or more positional sensors may be configured to receive position and attitude data of the imaging device in response to the trigger signal. In some embodiments, the positional sensors may comprise sensors (e.g., accelerometers, compasses or GPS, etc) that can measure the location, orientation and position data of the imaging device. The positional sensors may capture position and attitude data in response to the trigger signal. Alternatively, the position and attitude data of the imaging device may be retrieved from a motion capture system. In some embodiments, the motion capture system may be located remotely from the imaging device. In some embodiments, the motion capture system may be selected from the group consisting of a vision sensor, a barometer, an ultrasonic based navigation system, an indoor positioning system, and a lidar navigation/position.

In step 508, a attitude information calculating unit may receive a series of position and attitude data from the one or more positional sensors. Subsequently, the attitude information calculating unit may calculate the attitude information to be associated with the groups of pixels as previously described (e.g., interpolate positional states within a period of time). In some embodiments, if the trigger signal is generated at a lower rate of the imaging exposure rate, intermediate positional state may be calculated. For example, if the trigger signal is only generated at the initial group and final group of an image frame comprising N (N>2) groups of pixels, attitude and position data of the initial group and the final group may be computed for the corresponding positional state. Further, N−2 intermediate positional states may be computed by an interpolation method based on the known position of the initial and final position states. In other embodiments, if the trigger signal is generated at the same rate of the imaging exposure rate, the positional state associated with each group of pixels may be calculated directly without interpolation.

In step 510, an image correcting unit may be configured to process groups of pixels so that the resulting groups of pixels within a frame may be aligned and rolling shutter effect may be eliminated. The operations for processing image data have been substantially described in FIG. 3. Each individual group of pixels is corrected based on the associated attitude information (e.g., transformation matrix) so that the resulting image frames are free of distortion.

Step 502 may be repeated at a desired rate. The rate may be less than or equal to about 0.01 μs, 0.02 μs, 0.05 μs, 0.1 μs, 0.2 μs, 0.5 μs, 1 μs, 10 μs, 100 μs. The rate at which step 502 repeated may be related to the image capture/exposure rate of the imaging device. The rate may be the same as or lower from the rate at which the group of pixels is captured/exposed. In some instances, the rate at which step 502 repeated may not be uniform. For example, the rate may correspond to the motion of the imaging device, the rate may increase when a fast motion is detected and decrease when the imaging device is in slow motion. In other embodiments, the rate at which step 502 repeated may not be related to the image capture rate of the imaging device.

Figure 6:
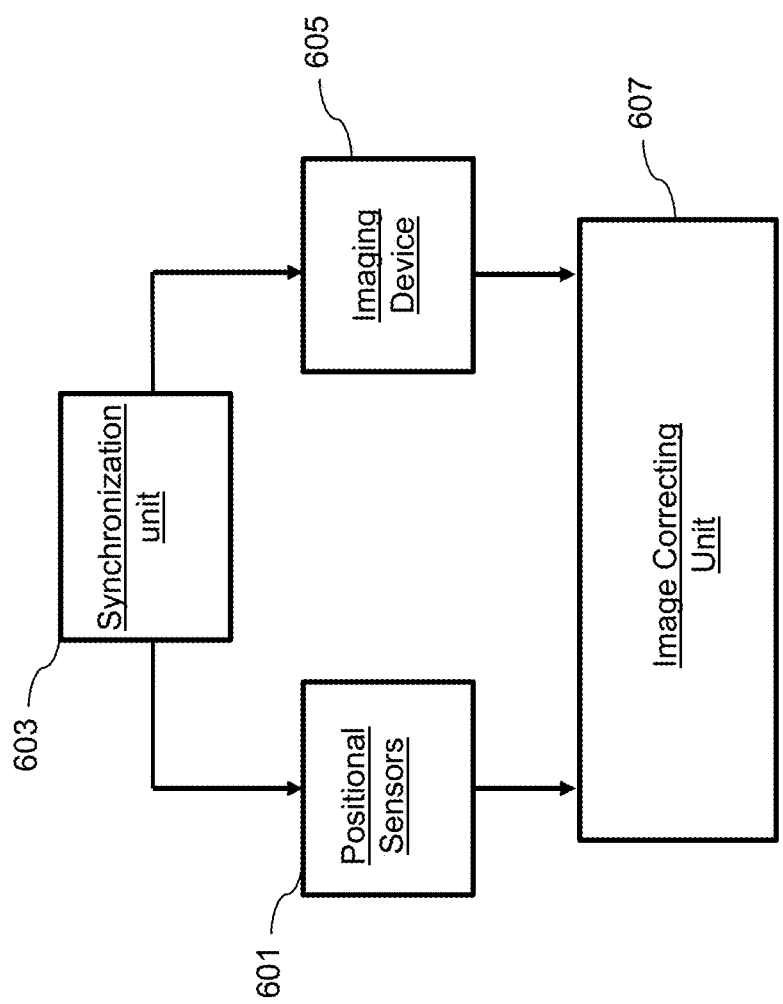
FIG. 6 illustrates exemplary block diagram of an image processing system.

As illustrated in FIG. 6, in some embodiments, obtaining groups of pixels by an imaging device 605 and obtaining attitude information by one or more positional sensors 601 may occur concurrently with aid of a synchronization unit 603. In other embodiments, the attitude information may be retrieved from the motion capture system. In some embodiments, the positional sensors 601 and imaging device 605 may be configured to capture positional data and image data in response to the trigger signal. Subsequently, one or more processors such as the attitude information calculating unit (e.g., the attitude information calculating unit 401 in FIG. 4) and image correcting unit 607 may receive groups of positional data and image data sequentially. In some embodiments, the electric signal may be the same signal that triggers a camera shutter. In some embodiments, the synchronization unit 603 may be incorporated with the camera processor such as the shutter controller.

Figure 7:
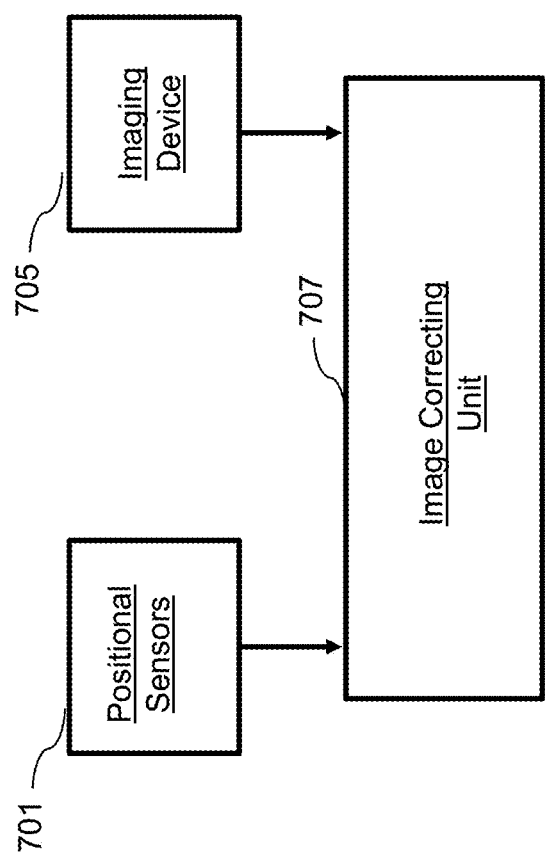
FIG. 7 illustrates exemplary block diagram of another image processing system.

In other embodiments, as illustrated in FIG. 7, obtaining groups of pixels by an imaging device 705 and obtaining attitude information by one or more positional sensors 701 may not occur concurrently such that positional data are not received at the time the image data received. In these embodiments, timestamps may be used to associate groups of pixels with positional data. An individual group of pixels may be associated with an image timestamp indicative of a time at which the individual group of pixels was derived. An image timestamp may include data of any length, such as 32 bit or 64 bit, and may be indicative of time. In some embodiments, the image timestamps may be generated by the imaging device 705 in response to a shutter signal. Alternatively, the image timestamp may be generated in response to an interruption signal (e.g., data ready interruption). Similarly, the captured attitude information of the imaging device may also include a positional timestamp indicative on a time at which the individual set of positional data was derived. In some embodiments, the positional timestamps can be generated by one or more positional sensors (e.g., IMU) indicative of a time at which the associated set of positional data is measured by the positional sensors. In some embodiments, the positional timestamps may be generated upon an output interrupt. For example, when a set of positional data such as an angular velocity measured by a gyroscope is acquired, the gyroscope may generate an interrupt (e.g., data ready interrupt) indicative of the gyroscope having positional data for output.

Positional states and groups of pixels may be correlated based on the image timestamps and positional timestamps. Assuming both the image timestamps and position timestamps are linear in time, the two sets of timestamps can be correlated by the following equation $$ts = m \cdot ti + d$$

where the coefficient m may be a constant determined by the data acquisition rate. The time bias/offset d may also be a constant. Various reasons may cause the constant time bias, such as unsynchronized system clock for generating the two timestamps or data transmission latency, etc. In some embodiments, a calibration process can be used to determine the time bias. The positional state associated with each individual group may be derived by interpolation of known positional states with respect to the timestamps. In some embodiments, Spherical linear interpolation (SLERP) may be utilized to derive the intermediate positions between the two known positional states. It should be appreciated that SLERP interpolation is merely an example and that any form of interpolation may be utilized with the example embodiments. Further, an image correcting unit 707 is configured to process groups of pixels based on the derived positional states.

The one or more positional sensors 701 may be configured to provide attitude information of the imaging device by measuring the position data and attitude data. The positional sensors may contain one or more motion or location sensors that sense the spatial disposition, velocity, and acceleration of the imaging device. The one or more sensors can include location sensors (e.g., global positioning system (GPS) sensors, mobile device transmitters enabling location triangulation), inertial sensors (e.g., accelerometers, gyroscopes, inertial measurement units (IMUs)), attitude sensors (e.g., compasses) pressure sensors (e.g., barometers) or field sensors (e.g., magnetometers, electromagnetic sensors). Any suitable number and combination of sensors can be used, such as one, two, three, four, five, six, seven, eight, or more sensors. The sensors disclosed herein may generate absolute measurement data that is provided in terms of a global coordinate system (e.g., position data provided by a GPS sensor, attitude data provided by a compass or magnetometer).

In a separate yet related aspect of the invention, an apparatus for processing an image frame comprising a plurality of groups of pixels is provided. In practicing, the apparatus may comprise one or more processors that are, individually or collectively, configured to: process the image frame being captured by an imaging device operably coupled to a movable object, wherein individual groups of the pixels of said plurality of pixels are exposed at different time points, and wherein said processing (1) takes place on-board of the movable object, and (2) uses attitude information of the imaging device and/or the movable object.

Figure 8:
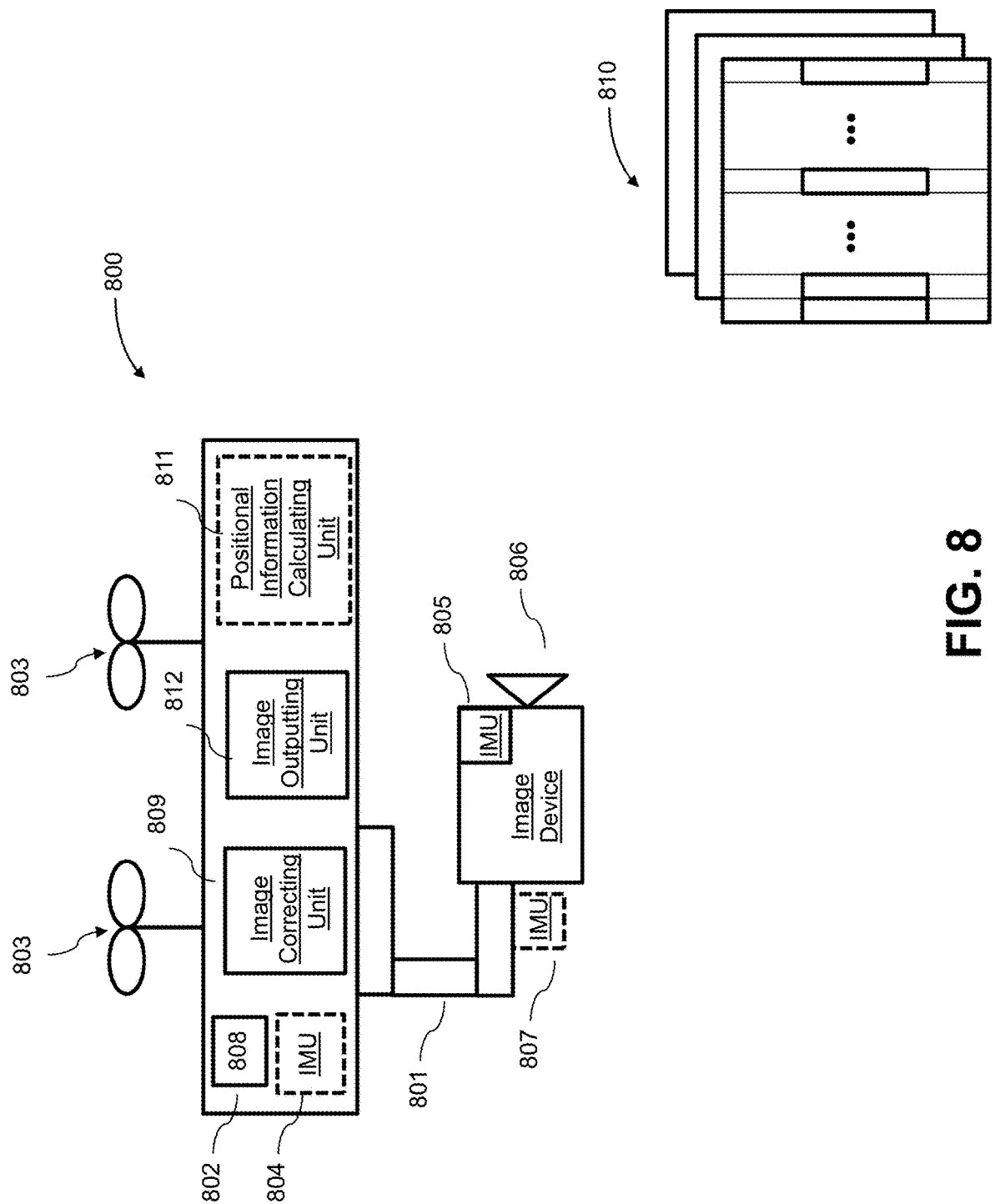
FIG. 8 is a schematic block diagram of a system for processing images on-board a movable object, in accordance with some embodiments.

FIG. 8 is a schematic block diagram of a system for processing images on-board a movable object, in accordance with some embodiments. In some embodiments, an imaging device 806 may be operably coupled to the movable object 800. The movable object 800 may be an aerial vehicle, a land vehicle, a vehicle traversing water body, a mobile phone, a tablet, a laptop, a wearable device, or a digital camera. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avians, canines, felines, equines, bovines, ovines, porcines, delphines, rodents, or insects.

The movable object 800 may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being. The movable object is not limited to any type of motion or vibration, such as high frequency, medium frequency and low frequency vibration resulted from any actuation system.

In some instances, the movable object 800 can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object 800 can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object 800 can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object 800 may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

As illustrated in FIG. 8, the movable object 800 may include a carrier 801 and a body 802. Although the movable object 800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV).

In some embodiments, the movable object 800 may be a UAV. The UAV can include a propulsion system any number of rotors (e.g., one, two, three, four, five, six, or more). The rotors or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 7 m, from 70 cm to 2 m, or from 5 cm to 5 m. Any description herein of a UAV may apply to a movable object, such as a movable object of a different type, and vice versa.

The movable object 800 may include propulsion mechanisms 803, a sensing system 804, and a communication system 808. When the propulsion mechanism is in operation, the movable object may subject to vibrations that may cause rolling shutter effect. The propulsion mechanisms 803 can include one or more of rotors, propellers, blades, engines, motors, wheels, axles, magnets, or nozzles, as previously described herein. The movable object may have one or more, two or more, three or more, or four or more propulsion mechanisms. The propulsion mechanisms may all be of the same type. Alternatively, one or more propulsion mechanisms can be different types of propulsion mechanisms. In some embodiments, the propulsion mechanisms 803 can enable the movable object 800 to take off vertically from a surface or land vertically on a surface without requiring any horizontal movement of the movable object 800 (e.g., without traveling down a runway). Optionally, the propulsion mechanisms 803 can be operable to permit the movable object 800 to hover in the air at a specified position and/or orientation.

For example, the movable object 800 can have multiple horizontally oriented rotors that can provide lift and/or thrust to the movable object. The multiple horizontally oriented rotors can be actuated to provide vertical takeoff, vertical landing, and hovering capabilities to the movable object 800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 800 (e.g., with respect to up to three degrees of translation and up to three degrees of rotation).

The sensing system 804 can include one or more sensors that may sense the spatial disposition, velocity, and/or acceleration of the movable object 800 (e.g., with respect to up to three degrees of translation and up to three degrees of rotation). The one or more sensors can include global positioning system (GPS) sensors, motion sensors, inertial sensors (IMU), proximity sensors, or image sensors. The sensing data provided by the sensing system 800 can be used to control the spatial disposition, velocity, and/or orientation of the movable object 800 (e.g., using a suitable processing unit and/or control module, as described below). Alternatively, the sensing system 800 can be used to provide attitude information of the movable object 800. The attitude information may include the attitude and position data of the movable object 800, to be used in conjunction with attitude information of the imaging device 806 for further calculation of positional state of image data.

In some embodiments, the communication system 808 may enable communication with a display device 810 having a communication system via wireless signals. The communication system 808, and the communication system embedded in the display device 810 may include any number of transmitters, receivers, and/or transceivers suitable for wireless communication. The communication may be one-way communication, such that data can be transmitted in only one direction. For example, one-way communication may involve only the movable object 800 transmitting data to the display device 810. The data may be transmitted from one or more transmitters of the communication system 808 to one or more receivers of the display device 810, or vice-versa. Alternatively, the communication may be two-way communication, such that data can be transmitted in both directions between the movable object 800 and the display device 810. The two-way communication can involve transmitting data from one or more transmitters of the communication system 808 to one or more receivers of the display device 810, and vice-versa.

In other embodiments, the display device 810 may be capable to receive image date from the image analyzer via an image outputting unit 812. In some embodiments, the image outputting unit may be configured to receive processed image frames from the image analyzer and transmit a video data to the display device 810. The communication between the image outputting unit and image analyzer, image outputting unit and display device can be wired or wireless transmission. Any suitable means of transmitting image data can be used, such as optical fibers, storage media, computer buses and the like. In some embodiments, the image outputting unit may be configured to further process the corrected image data such as compression or crop before sending it to the display device.

For purpose of illustration, the embodiment as shown in FIG. 8 includes a single display device. However, in other embodiments, more display devices may be included.

A payload may be provided on the movable object 800. In some embodiments, the payload may comprise the imaging device 806. In some embodiments, the imaging device 806 can be coupled to the movable object 800 via a carrier 801.

In some embodiments, the imaging device 806 may be stationary relative to the movable object 800. The imaging device can be integrally formed with the carrier 801. Alternatively, the imaging device can be releasably coupled to the carrier. The imaging device can be coupled to the carrier in any suitable configuration, as long as there is no relative movement between the carrier 801 and the imaging device 806. Further, the carrier 801 can be integrally formed with the movable object 800. Alternatively, the carrier 801 can be releasably coupled to the movable object 800. The carrier can be coupled to the movable object directly or indirectly. The carrier 801 can be coupled to the movable object 800 in any suitable configuration, as long as there is no relative movement between the carrier 801 and movable object 800. Accordingly, the imaging device 806 is stationary relative to the movable object 800. In these embodiments where the imaging device is moving corresponding to the movable object, the motion sensing system 804 (e.g., IMU) of the movable object may be used to provide attitude information of the imaging device. In some embodiments, the motion sensing system may comprise an IMU that is configured to provide the attitude and position data of the movable object 800.

In some embodiments, the imaging device 806 may be in motion. Motion of the imaging device may include translational movement of the device, rotational movement of the device, curvilinear motion of the device, changing orientation (e.g., attitude, pitch, roll, yaw) of the device, zoom-in or zoom-out (magnification) of the device, or any combination of the above. Motion of the imaging device may be of high-frequency that the frequency may be high enough to cause rolling shutter effect.

Furthermore, the imaging device 806 may be operably coupled to a portion of the UAV (e.g., processing unit, control system, data storage). One or more imaging devices may be situated on the UAV. For example, 1, 2, 3, 4, 5 or more imaging devices may be situated on the UAV. The one or more imaging devices may have the same field of view or a different field of view. Each of the one or more imaging devices may be coupled to one or more processors. In some embodiments, the one or more imaging devices may share the same positional sensors (e.g., IMU). In other embodiments, each imaging device may be associated with an individual IMU. Each of the one or more imaging devices may individually or collectively perform the methods mentioned herein.

Alternatively, the imaging device 806 may have relative movement with respect to the movable object 800. The movement can be a translation with respect to up to three degrees of freedom (e.g., along one, two, or three axes) or a rotation with respect to up to three degrees of freedom (e.g., about one, two, or three axes), or any suitable combination thereof. In these embodiments, a first motion sensor (e.g., IMU 804) may be operably coupled to the movable object 800 providing attitude information of the movable object, and a second motion sensor 805 may be operably coupled to the imaging device 806, wherein the second motion sensor may provide attitude information of the relative movement between the movable object and the imaging device. Consequently, attitude information of the imaging device can be derived based on a combination of the attitude information of the movable object 800 and the relative motion with respect to the movable object 800.

In some embodiments, the imaging device 806 is mounted on a stabilization system which is supported by the movable object 800. The stabilization system may be configured to allow the imaging device 806 rotate along one or more axis relative to the movable object 800 based on the driving forces from the gimbal. The stabilization system may comprise up to three axes. A gimbal for supporting multiple-axis rotation may be coupled to the movable object and the imaging device 806 connected with the gimbal may move up and down. The movable object 800 may be operably coupled to a first IMU 804 where the IMU is configured to measure attitude information of the movable object. In some instances, the relative movement of imaging device with respect to the movable object may be obtained by rotation information provided by one or more sensors of the stabilization system. The one or more sensors may detect rotations of the imaging device 806 with respect to the movable object 800. The sensors may be located on the support bars, link bars, handle assemblies, and/or motors of the gimbal, such that the sensors can detect the rotation of the imaging device about rotation axes, such as yaw, roll, and pitch axes. In some embodiments, the sensors may be inertial sensors (e.g., positional or angular displacement sensors, velocity sensors, accelerometers, gyroscopes, and magnetometers), capacitive sensors, Hall sensors, or any other types of sensors as described elsewhere herein. In some instances, the sensors may be capable of detecting linear and/or angular displacement, linear velocity and/or angular velocity, or linear or angular acceleration. These sensors may or may not be provided on any portion of the handle assembly, such as a grip, handle bar, or any other portion. The sensors may or may not be provided on one, two, three or more of the motors. Consequently, the attitude information of imaging device 806 may be derived by compensating the relative movement between the imaging device and the movable object 800. In other instances, the relative movement between the imaging device and movable object is provided by a second IMU 807 located on a frame of the stabilization system so that the IMU 807 is rigidly connected to the imaging device 806. Similarly, the attitude information of imaging device 806 may be derived by compensating the relative movement the imaging device and the movable object 800.

As used herein, a movable object may refer to any object that may be moved as described elsewhere. For example, the movable object may be a mobile phone, a watch, an unmanned aerial vehicle (UAV), a car, a boat, a computer, a PDA, a tablet, etc. While many embodiments herein are described with reference to UAVs, it shall be understood that the reference is non-limiting, and that the embodiments are equally applicable to any movable object. Furthermore, the movable object maybe in motion. The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation.

As shown in FIG. 8, the one or more processors for image processing can be located on-board the movable object 800. Processors for image processing may include an image correcting unit 809 and a attitude information calculating unit 811. In some embodiments, the image correcting unit 809 may correspond to the image correcting unit 607 in FIG. 6. In some embodiments, the attitude information calculating 811 may correspond to the attitude information calculating unit 401 in FIG. 4. These processors may be located on a central body of the movable object or on a peripheral part of the movable object (e.g., on a carrier coupled to the movable object). The one or more processors of the present invention can be situated on any suitable portion of a movable object, such as above, underneath, on the side(s) of, or within a body of the movable object. The processors may be located on a center or off-center of the movable object. Some processors can be mechanically coupled to the movable object such that the spatial disposition and/or motion of the movable object correspond to the spatial disposition and/or motion of the processors. The processor can be coupled to the movable object via a rigid coupling, such that the processor does not move relative to the portion of the movable object to which it is attached. The coupling can be a permanent coupling or non-permanent (e.g., releasable) coupling. Suitable coupling methods can include adhesives, bonding, welding, and/or fasteners (e.g., screws, nails, pins, etc.). Optionally, the processor can be integrally formed with a portion of the movable object. Furthermore, the processor can be electrically coupled with a portion of the movable object (e.g., processing unit, control system, data storage, flight controller) so as to enable the data collected by the processor to be used for various functions of the movable object (e.g., navigation, control, propulsion, collision avoidance maneuver, etc.), such as the embodiments discussed herein. The processor may be operably coupled with a portion of the movable object (e.g., processing unit, control system, data storage).

In some embodiments, the one or more processors for processing image frames may be located on the imaging device 806. The one or more processors may include the image correcting unit 809 and the attitude information calculating unit 811. Additionally, one or more processors for adjusting apertures of the lens or zooming of the camera may also be located on-board of the imaging device 806. The processors may be embedded in the imaging device or located on-board of the imaging device. In other embodiments, at least one processor for processing the image frame is located on the movable object and at least one processor for adjusting apertures of the lens or zooming is located on the imaging device.

In another aspect, the present invention provides a method for processing an image frame captured by an imaging device that is coupled to a movable object. In practicing, the image frame may be processed using one or more processors individually or collectively. The image frame may comprise a plurality of pixels that are exposed to light at different time points while imaging device is in motion. Image processing may take place on-board of the movable object, and may utilize attitude information of the imaging device and/or the movable object.

In some embodiments, image processing may take place concurrent with capturing the image frame. A series of groups of pixels may be captured by a rolling shutter imaging device sequentially and received by an image analyzer for processing. Each individual group of pixels may be processed based on the associated attitude information measured concurrently with capturing of the group of pixels. In some embodiments, the attitude information of a reference group may be required for rolling shutter correction. In some instances, the reference group may be the initial group captured within an image frame. The attitude information may be derived from the position and attitude data of the imaging device at the time the initial group of pixels is captured. In some embodiments, the time at which a group of pixels is captured may be represented by the time the first row within the group is captured. A time delay between image processing and image capturing may be determined by the duration time for exposing a group of pixels. The time delay is substantially short, which is about or less than 1 µs, 10 µs, 20 µs, 30 µs, 50 µs, 100 µs. In such case, only one image frame may be buffered for processing and outputting to a display device.

In other embodiments, image processing may take place after the whole image frame is captured. A sequence of groups of pixels may be captured by a rolling shutter imaging device. The groups of pixels may have associated image timestamps. Once the final group of an image frame is captured the whole frame may be output to an image analyzer for processing. Each individual group of pixels may be processed based on the correlated positional state and the positional state of the reference group. The positional state associated with each group may be computed by correlating the positional data with the image data based on the image timestamps and position timestamps. The positional state associated with each group of pixels may be calculated after an entire image frame is captured. Positional states associated with each individual group may be derived by interpolation of known positional states with respect to the timestamps. In some embodiments, the known positional states may be derived from the position data and attitude data correspond to the initial group and the final group within the image frame respectively. Further, a sequence of positional states corresponding to the intermediate groups may be calculated via an interpolation method as previously described herein.

In some embodiments, the image data captured by the imaging device may be stored in a media storage (not shown) before the image data is provided to the image analyzer. The image analyzer may be configured to receive the image data directly from the media storage. In some embodiments, the image analyzer may be configured to receive image data concurrently from both the imaging device and the media storage. The media storage can be any type of storage medium capable of storing image data of a plurality of objects. As previously described, the image data may include video or still images. The video or still images may be processed and analyzed by the image analyzer, as described later in the specification. The media storage can be based on semiconductor, magnetic, optical, or any suitable technologies and may include flash memory, USB drives, memory cards, solid-state drives (SSDs), hard disk drives (HDDs), floppy disks, optical disks, magnetic tapes, and the like. The media storage can also include external hard disk drives, optical drives, tape drives, floppy drives, and other suitable storage devices that may be operatively connected to the imaging device. In some embodiments, the media storage can also be a computer capable of providing image data to the image analyzer.

As another example, the media storage can be a web server, an enterprise server, or any other type of computer server. The media storage can be computer programmed to accept requests (e.g., HTTP, or other protocols that can initiate data transmission) from the image analyzer and to serve the image analyzer with requested image data. In addition, the media storage can be a broadcasting facility, such as free-to-air, cable, satellite, and other broadcasting facility, for distributing image data. The media storage may also be a server in a data network (e.g., a cloud computing network).

In some embodiments, the media storage may be located on-board the imaging device. In some other embodiments, the media storage may be located on-board the movable object but off-board the imaging device. In some further embodiments, the media storage may be located on one or more external devices off-board the movable object and/or the imaging device. In those further embodiments, the media storage may be located on a remote controller, a ground station, a server, etc. Any arrange or combination of the above components may be contemplated. In some embodiments, the media storage may communicate with the imaging device and the movable object via a peer-to-peer network architecture. In some embodiments, the media storage may be implemented using a cloud computing architecture.

In another aspect, the present invention provides a method for processing an image frame comprising a plurality of pixels. In practicing, the method may comprise: processing, with the aid of one or more processors that individually or collectively, the image frame being captured by an imaging device operably coupled to a movable object, wherein individual groups of the pixels of said plurality of pixels are exposed at different time points, and wherein said processing (1) takes place on-board of the movable object, and (2) uses attitude information of the imaging device and/or the movable object.

Figure 9:
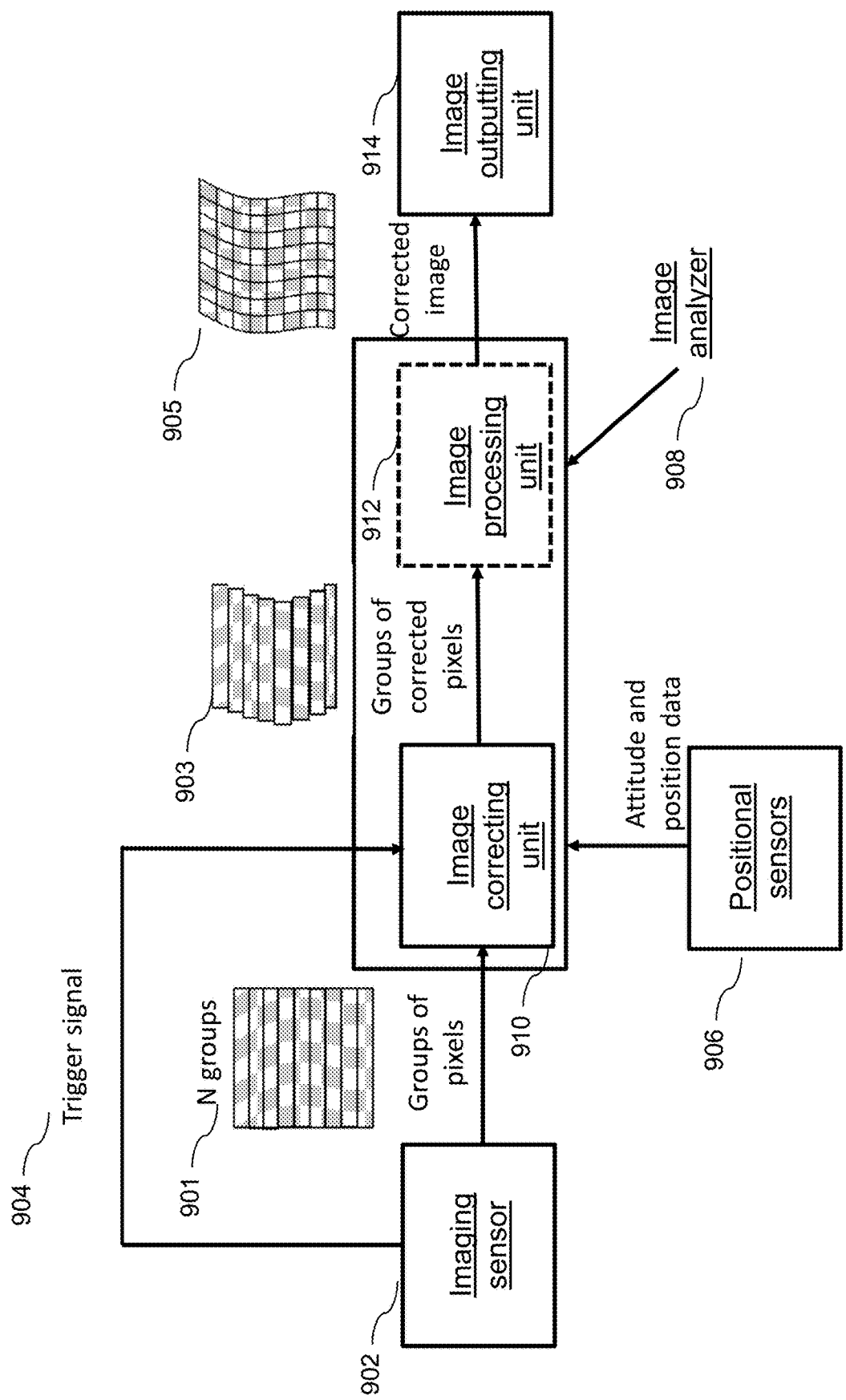
FIG. 9 illustrates an exemplary method for real-time rolling shutter correction, in accordance with some embodiments.

In contrast to current stabilization and rectification methods that require post offline calibration and image processing, the example embodiments presented herein may provide real-time rolling shutter correction based on the attitude information of the imaging device. FIG. 9 illustrates an example of adopting the method described herein to accomplish real-time rolling shutter correction. In some embodiments, an imaging device may be a camera comprising an imaging sensor 902. The imaging sensor may be configured to shoot a video comprising a series of image frames. The series of images may be about or more than 2, 3, 4, 5, 6, 7, 8, 9, 10, 15, 20, 30, 40, or 50 images. The series of images may be substantially simultaneously captured or be captured over time. The series of image frames may include images of the same or substantially similar scene. The series of image frames may include images of the same or substantially similar field of view (FOV). The field of view of an imaging device may be the extent of the environment that is detectable (e.g., visible) by the imaging device. The field of view may be related to the angle of view, which may be measured by the angular extent of a given scene that is imaged by the imaging device. The angle of view of an imaging device may be at an angle of less than or about 360°, 300°, 240°, 180°, 120°, 60°, 30°, 20°, 10°, 5°, or 1°. The series of images may be captured using an image capture device at a specific capture rate. In some embodiments, the images may be captured at standard video frame rates such as about 24p, 25p, 30p, 48p, 50p, 60p, 72p, 90p, 100p, 120p, 300p, 50i, or 60i. In some embodiments, the images may be captured at a rate less than or equal to about once every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, or 10 seconds.

In some embodiments, the imaging sensor 902 may be configured to shoot a video concurrently with out-putting the video by an image outputting unit 914. In this case, an individual adjusted image frame may be output prior to or concurrent with taking and/or adjusting one or more subsequent image frames of the video. In some embodiments, an image processing operation may be performed at single frame rate with single image frame buffered in a memory unit. As illustrated in FIG. 9, N groups of pixels that compose a whole frame 901 may be captured by the imaging sensor 902, and an image correcting unit 910 may be configured to receive N sets of attitude and position data from the positional sensors 906 in response to the trigger signal 904. The image correcting unit 910 (correspond to image correcting unit 403 in FIG. 4) may process the groups of pixels for rolling shutter correction based on the attitude data. The resulting image frame 903 may be free of rolling shutter effect after applying the method previously described herein. Subsequently, the processed image frame 905 may be transmitted to an image outputting unit 914. In some embodiments, the image outputting unit 914 may correspond to the image outputting unit 812 in FIG. 8. For each image frame, the processing procedure may comprise capturing N group of pixels and N sets of associated attitude data then processing each individual group of pixels based on the associated positional state derived from the attitude data. Once the correction of the final group is completed, an entire image frame may be transmitted to the image outputting unit for display. The procedure may be repeated until the exposure stops. During the process, only one image frame may be buffered in the memory for processing. There may be a time delay between shooting a video and out-putting a video. This time delay however is substantially short, and is dependent on the exposure time of an image frame. In some embodiments, the time delay may be about or less than 0.0001 seconds, 0.0002 seconds, 0.0005 seconds, 0.001 seconds, and 0.002 seconds. Accordingly, at least one processed image frame is output to a display device or processor prior to completing capturing one or more subsequent image frames of the video. Alternatively, at least one processed group of pixels is output to a display device or processor prior to completing capturing one or more subsequent image frames of the video.

In other embodiments, each group of pixels may comprise a plurality (a predetermined number) of rows or columns. In some instances, image distortion may not be eliminated within the group in image frame 903. In this case, the image analyzer 908 may further comprise an image processing unit 912 for correcting the distortion within a group. In some embodiments, the inner group distortion may be corrected by an image transformation matrix between current image frame and a reference image frame. The reference image frame may be obtained while the imaging device is substantially stationary. In some embodiments, the transformation matrix may be a projection transformation matrix (e.g., affine transformation). In some embodiments, the transformation matrix may be derived by firstly finding matching points in the reference image and current image. In some instances, corners (e.g., Harris corner) can be used as the corresponding points. In some instances, the matching points can be identified by cross correlation techniques (e.g. NCC). Next, a plurality of hypothesized matches may be derived by normal cross correlation (NCC). Estimation methods may be applied to identify the matches consistent with a transformation such as an affine transformation. In some instances, the estimation method may be RANSAC (random sample consensus). Finally, the parameters of the affine transformation may be computed by fitting the matching points using a fitting method (e.g., least squares). After applying the processing method as described herein, an image frame 905 free of inter group and/or inner group distortion may be obtained. In some embodiments, one or more image frames may be buffered in a memory unit for image processing.

In some instances, the time interval between shooting two subsequent image frames may be in a range from about 0.1 ms to about 50 ms. The time interval may be dependent on the image capturing rate. The series of images may be captured using the image capture device at a specific capture rate. In some embodiments, the images may be captured at standard video frame rates such as about 24p, 25p, 30p, 48p, 50p, 60p, 72p, 90p, 100p, 120p, 300p, 50i, or 60i. In some embodiments, the images may be captured at a rate less than or equal to about once every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, or 10 seconds.

In some instances, the time interval between exposing two subsequent groups of pixels may be in a range from about 1 μs to 50 μs, which can be determined by the frame rate and number of groups in an image frame.

In some embodiments, the processed video may be output for display on an external device that is located remotely from the video camera. In some embodiments, the image outputting unit may be configured to communicate with the external device. The external device can be a display device such as, for example, a display panel, monitor, television, projector, or any other display device. In some embodiments, the output device can be, for example, a cell phone or smartphone, personal digital assistant (PDA), computer, laptop, desktop, a tablet PC, media content player, set-top box, television set including a broadcast tuner, video game station/system, or any electronic device capable of accessing a data network and/or receiving analyzed image data from the image analyzer.

In a separate yet related aspect of the invention, an apparatus for shooting a video comprising a series of image frames may be provided. In practicing, the apparatus may comprise one or more processors that are, individually or collectively, configured to: take the video by an imaging device operably coupled to a movable object, wherein an individual image frame of said series is generated by exposing a portion of photosensors corresponding to a portion of pixels in said image frame; assess, with the aid of one or more processors that individually or collectively, attitude information of said imaging device and/or the movable object; and adjust, on-board of said imaging device and/or said movable object, at least one of the image frames in said series using the assessed attitude information.

In another aspect, the invention provides a method of shooting a video comprising a series of image frames, comprising: taking the video by an imaging device operably coupled to a movable object, wherein taking the video by an imaging device operably coupled to a movable object, wherein an individual image frame of said series is generated by exposing a portion of photosensors corresponding to a portion of pixels in said image frame; assessing, with the aid of one or more processors that individually or collectively, attitude information of said imaging device and/or the movable object; and adjusting, on-board of said imaging device and/or said movable object, at least one of the image frames in said series using the assessed attitude information. Further, the method may comprise a step of out-putting the at least one of the adjusted image frames from the imaging device or the movable object to an external device.

As described herein, a photosensor may be a camera sensor, or any sensor that comprises rolling shutter, such as complementary metal oxide semiconductor (CMOS) sensors. The photosensor may generate electrical signals in response to wavelengths of light. The light typically includes but not limited to visible light, infrared transmission (IR), and/or ultraviolet (UV) energy. The resultant electrical signals can be processed to produce image data.

In some embodiments, a portion of photosensor may refer to a group of pixels. The group of pixels may contain a plurality of rows or columns of pixels. In some embodiments, the plurality of rows or columns that compose an individual group may not be adjacent to each other. For example, a group may contain row 1, row 3, and rows instead of a consecutive series of rows 1, 2 and 3. In such case, row 1, row 3 and row 5 may be exposed to light nearly concurrently. In other embodiments, non-uniform group division may be used which means different groups may have different number of rows or columns. For example, instead of grouping every 5 rows, rows may be grouped based on how far the orientation has deviated from the previous group. The faster the orientation changes, the fewer rows may be contained in a group.

In some instances, not all of the groups of pixels contained in an image frame are processed. When the relative motion between the imaging device and imaged object is small or nearly stationary, image data may not be processed for rolling shutter correction.

In some embodiments, a video comprising a series of adjusted image frames may be transmitted to an external device. The video may be output to a processor and one or more frames contained in the video may be processed by the processor. The processor for processing image data may be operatively coupled to an external device (e.g., via a general purpose memory controller (GPMC) connection). Any suitable means of transmitting image data can be used, such as wired or wireless transmission.

In some embodiments, adjusting an individual group of pixels of a particular image frame may be concurrent with exposing a portion of the photosensors corresponding to one or more subsequent groups of pixels within the particular image frame. For example, as shown in FIG. 2, at time t2 when group 2 is exposed, group 1 may be transmitted to image analyzer for processing. It is noted that group 1 may be adjusted concurrently with any subsequent group exposed to light. Given that, once the final group of a particular frame is exposed, at least one group of pixels from the same image frame may have been completed processing.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An image processing method comprising:
   obtaining, through an imaging device, an image frame over a period of time, wherein the image frame comprises a plurality of groups of pixels that are exposed to light at different time points within the period of time;
   obtaining attitude information of the imaging device during the period of time, wherein the attitude information of the imaging device is measured by a motion capture system located remotely from the imaging device, the motion capture system including at least one of a vision sensor, a barometer, an ultrasonic based navigation system, an indoor positioning system, or a lidar;
   deriving positional state of an individual group of pixels in the plurality of groups of pixels based on the attitude information of the imaging device; and
   processing the image frame using the positional state.

2. The method of claim 1, wherein the image frame comprises an image of a target or a portion thereof, and the image frame is obtained while the target and the imaging device are moving relative to each other.

3. The method of claim 1, wherein the positional state of the individual group of pixels is derived from the attitude information of the imaging device when exposing the individual group of pixels at one of the time points.

4. The method of claim 1, wherein:
   obtaining the attitude information of the imaging device comprises:
      obtaining, from one or more sensors operably coupled to the imaging device, a first set of positional data of the imaging device at a first one of the time points;
      obtaining, from the one or more sensors, a second set of positional data of the imaging device at a second one of the time points;
      the individual group of pixels are exposed at one of the time points between the first one of the time points and the second one of the time points; and
   deriving the positional state of the individual group of pixels comprises:

calculating an individual set of positional data of the imaging device at the one of the time points based on the first set of positional data and the second set of positional data according to a simulation model; and deriving the positional state of the individual group of pixels based on the individual set of positional data.

5. The method of claim 1, wherein an inertial measurement unit (IMU) is rigidly coupled to the imaging device and configured to measure the attitude information of the imaging device.

6. The method of claim 1, wherein processing the image frame comprises correcting the individual group of pixels using position data from the positional state of the individual group of pixels.

7. The method of claim 6, wherein the individual group of pixels are compensated with a direction and a magnitude derived from the position data, and the direction is opposite to a translational shifting direction of the imaging device determined from the position data.

8. The method of claim 6, wherein the translational shifting direction of the imaging device is relative to another group of pixels within the frame.

9. The method of claim 1, wherein processing the image frame comprises correcting the individual group of pixels using attitude data of the positional state of the individual group of pixels.

10. The method of claim 9, wherein the individual group of pixels are corrected using a transformation matrix determined from the attitude data.

11. The method of claim 1, wherein processing the image frame comprises correcting the individual group of pixels using position data from the positional state of the individual group of pixels in conjunction with attitude data of the positional state of the individual group of pixels.

12. The method of claim 11, wherein the individual group of pixels are corrected using a transformation matrix determined from position data and attitude data corresponding to another group of pixels and the position data and the attitude data corresponding to the individual group of pixels.

13. The method of claim 1, wherein the imaging device is operably coupled to a movable object.

14. The method of claim 13, wherein the movable object is stationary relative to the imaging device, and the attitude information of the imaging device is obtained from one or more sensors configured to measure attitude information of the movable object.

15. The method of claim 13, wherein:
the movable object permits relative movement between the imaging device and the movable object; and
obtaining the attitude information of the imaging device comprises compensating attitude information of the movable object based upon the relative movement between the movable object and the imaging device.

16. The method of claim 15, wherein:
a first inertial measurement unit (IMU) is coupled to the movable object and configured to measure the attitude information of the movable object;

the imaging device is operably coupled to a second IMU; and
the relative movement between the movable object and the imaging device is determined by data retrieved from the first IMU and data retrieved from the second IMU.

17. The method of claim 13, wherein the imaging device is mounted on a stabilization system supported by the movable object, and the stabilization system permits the imaging device to rotate along one or more axes relative to the movable object.

18. The method of claim 17, wherein the attitude information of the imaging device is obtained by compensating attitude information of the movable object along at least one of the one or more rotational axes.

19. An image processing apparatus comprising:
one or more processors; and
a non-transitory computer readable medium storing program instructions that, when executed by the one or more processors, cause the one or more processors to individually or collectively:
obtain, through an imaging device, an image frame over a period of time, wherein the image frame comprises a plurality of groups of pixels that are exposed to light at different time points within the period of time;
obtain attitude information of the imaging device during the period of time, wherein the attitude information of the imaging device is measured by a motion capture system located remotely from the imaging device, the motion capture system including at least one of a vision sensor, a barometer, an ultrasonic based navigation system, an indoor positioning system, or a lidar;
derive positional state of an individual group of pixels in the plurality of groups of pixels based on the attitude information of the imaging device; and
process the image frame using the positional state.

20. An image processing method comprising:
obtaining, through an imaging device operably coupled to a movable object, an image frame over a period of time, wherein the image frame comprises a plurality of groups of pixels that are exposed to light at different time points within the period of time;
obtaining attitude information of the imaging device during the period of time, wherein obtaining the attitude information of the imaging device includes compensating attitude information of the movable object based upon a relative movement between the movable object and the imaging device;
deriving positional state of an individual group of pixels in the plurality of groups of pixels based on the attitude information of the imaging device; and
processing the image frame using the positional state.

* * * * *